(12) United States Patent
Sorin et al.

(10) Patent No.: US 10,023,159 B2
(45) Date of Patent: Jul. 17, 2018

(54) METHOD OF MANAGING THE BRAKING OF AN AIRCRAFT, AND A CORRESPONDING BRAKING SYSTEM

(75) Inventors: Anthony Sorin, Versailles (FR); David Lemay, Chaville (FR); Michel Basset, Heimsbrunn (FR); Yann Chamaillard, Le Bardon (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 974 days.

(21) Appl. No.: 12/955,397

(22) Filed: Nov. 29, 2010

(65) Prior Publication Data

US 2011/0127828 A1    Jun. 2, 2011

(30) Foreign Application Priority Data

Nov. 30, 2009   (FR) .................................... 09 05746

(51) Int. Cl.
  *B60T 1/10* (2006.01)
  *B60T 13/58* (2006.01)
(52) U.S. Cl.
  CPC .............. *B60T 1/10* (2013.01); *B60T 13/586* (2013.01)
(58) Field of Classification Search
  CPC ......... B60T 1/10; B60T 13/586; B64C 25/42; B64C 25/44; G06F 19/00
  USPC .......... 303/3, 20, 152; 180/65.1, 65.3, 65.5, 180/65.6; 244/111, 110 R, 110 C; 188/158–162
  See application file for complete search history.

(56) References Cited

U.S. PATENT DOCUMENTS

| | | | | |
|---|---|---|---|---|
| 5,378,053 A * | 1/1995 | Patient et al. | ..................... | 303/3 |
| 6,120,115 A * | 9/2000 | Manabe | ........................ | 303/152 |
| 6,179,395 B1 * | 1/2001 | Schneider | ..................... | 303/152 |
| 6,275,763 B1 * | 8/2001 | Lotito et al. | ..................... | 701/71 |
| 6,702,404 B2 * | 3/2004 | Anwar et al. | ................. | 303/152 |
| 6,871,919 B2 * | 3/2005 | Anwar et al. | ................. | 303/152 |
| 7,029,077 B2 * | 4/2006 | Anwar et al. | ................. | 303/152 |
| 7,226,018 B2 * | 6/2007 | Sullivan | ........................ | 244/111 |
| 7,311,163 B2 * | 12/2007 | Oliver | ........................... | 180/165 |
| 2003/0184155 A1 * | 10/2003 | Crombez et al. | ............. | 303/152 |
| 2005/0224642 A1 | 10/2005 | Sullivan | | |
| 2007/0284939 A1 * | 12/2007 | Charles et al. | ............... | 303/152 |
| 2008/0174174 A1 * | 7/2008 | Burns et al. | ................... | 303/152 |
| 2008/0258014 A1 * | 10/2008 | McCoskey et al. | ........... | 244/221 |

FOREIGN PATENT DOCUMENTS

EP            1 867 567 A1      12/2007

* cited by examiner

*Primary Examiner* — Thomas J Williams
*Assistant Examiner* — Mariano Sy
(74) *Attorney, Agent, or Firm* — Sughrue Mion, PLLC

(57) ABSTRACT

A method of managing the braking of an aircraft having landing gear with wheels fitted with friction brakes and with auxiliary brakes that enable energy to be dissipated by other than friction. The method comprises the steps of, (1) when braking is requested, testing the braking parameters to determine whether the aircraft is in a braking situation for which the friction brakes are not essential for providing the requested braking, and (2) performing the requested braking by giving priority to actuating the auxiliary brakes so long as the aircraft remains within the braking situation, and actuating the friction brakes only if the aircraft departs from the braking situation.

10 Claims, 2 Drawing Sheets

METHOD OF MANAGING THE BRAKING OF AN AIRCRAFT, AND A CORRESPONDING BRAKING SYSTEM

The invention relates to a method of managing the braking of an aircraft, and to a corresponding braking system.

BACKGROUND OF THE INVENTION

It has been known for a long time to brake the wheels of aircraft by means of a friction brake having a certain number of friction elements, in particular stator disks and rotor disks. Proposals have been made to fit such braked wheels with an auxiliary member that provides energy dissipation by means other than friction, for example an electromagnetic or hydraulic member. Such auxiliary members dissipate the kinetic energy of the aircraft by producing electrical or hydraulic energy that can be recovered. This production of recoverable energy is accompanied by additional braking of the wheel, and advantage may be taken thereof to reduce the amount of wear of the friction elements of the friction brake.

OBJECT OF THE INVENTION

The object of the invention is to propose a method of managing the braking of an aircraft and a corresponding braking system for minimizing the wear of friction elements.

BRIEF SUMMARY OF THE INVENTION

In order to achieve this object, the invention provides a method of managing the braking of an aircraft having landing gear with wheels fitted with friction brakes and with auxiliary brakes that enable energy to be dissipated by means other than friction, the method comprising the steps of:
  when braking is requested, testing the braking parameters to determine whether the aircraft is in a braking situation for which the friction brakes are not essential for providing the requested braking; and
  performing the requested braking by giving priority to actuating the auxiliary brakes so long as the aircraft remains within said braking situation, and actuating the friction brakes only if the aircraft departs from said braking situation.

The above-mentioned braking situation corresponds typically to taxiing situations in which it is rarely essential to use the friction brakes, with the auxiliary brakes being used to a great extent as a replacement for the friction brakes so that the wear of the friction elements is minimized.

More precisely, in another implementation of the invention that is not limiting, the braking situation corresponds to conditions in which the requested braking torque is less than a maximum torque that can be developed by the auxiliary brake, the temperature of the auxiliary brake is less than an acceptable temperature threshold, and no hard and rapid thrust is detected as being applied to the brake pedals.

BRIEF DESCRIPTION OF THE DRAWINGS

Other characteristics and advantages of the invention appear on reading the following description of a particular, non-limiting implementation of the method of the invention with reference to the accompanying figures, in which.

DETAILED DESCRIPTION OF THE INVENTION

Figure 1:
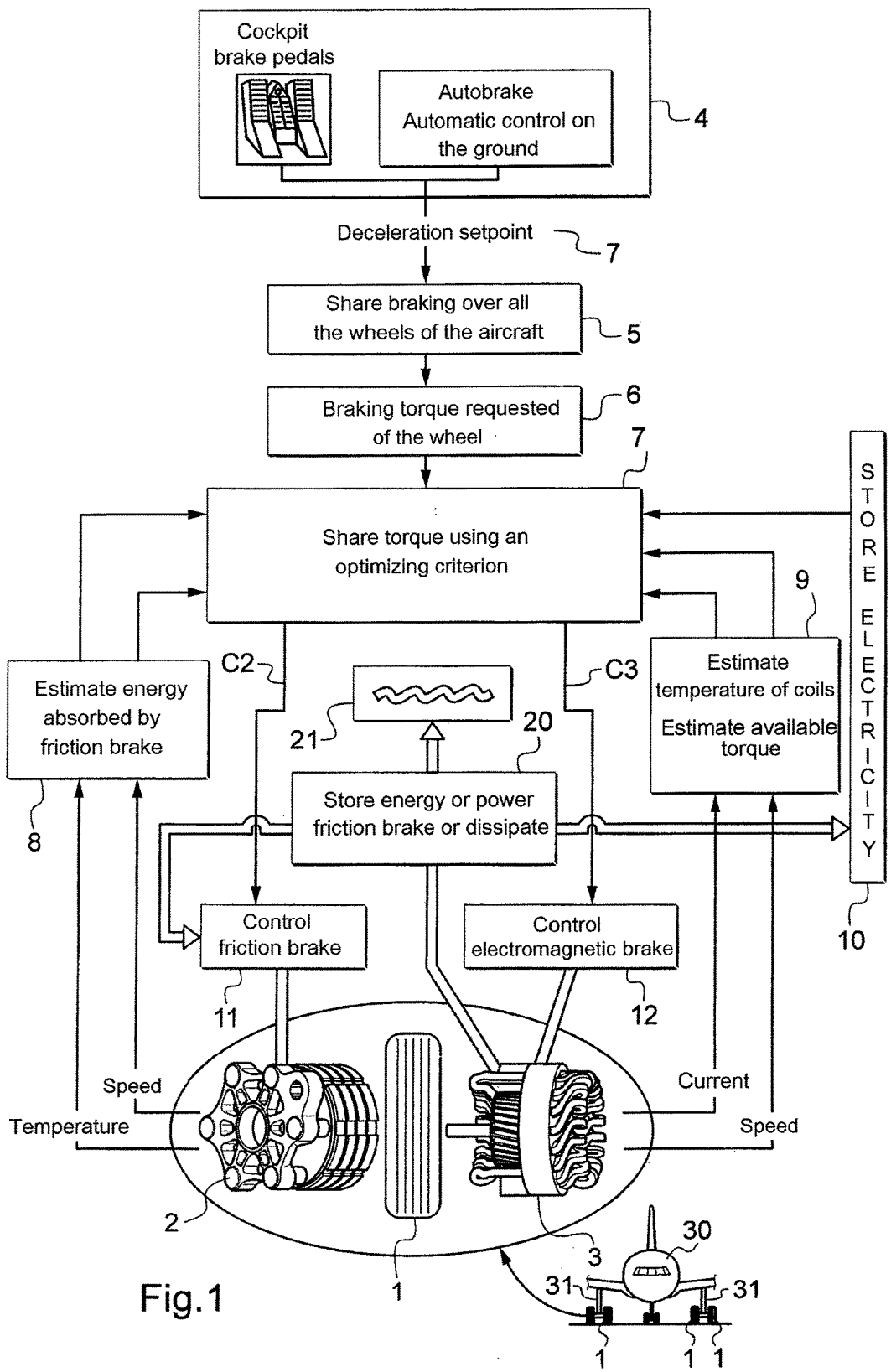
FIG. 1 is a block diagram illustrating the method of the invention in general manner together with the corresponding braking system.

With reference to FIG. 1, in which control or measurement connections are drawn using single lines and power connections are drawn using pairs of lines, the braking system is carried by an aircraft 30 having landing gear 31 with wheels 1, only one of which is shown in detail in the figure. In the embodiment shown, the wheels 1 are fitted with respective friction brakes 2, here electrically-actuated brakes, and with respective auxiliary brakes 3, here of the electromagnetic type.

The braking system also includes a setpoint generator member 4 such as a brake pedal or a taxiing automatic control member for generating a deceleration setpoint 7. The deceleration setpoint generator 4 is connected to a member for sharing the braking over all of the wheels of the airplane as a function of the configuration of each of the wheels and of the associated braking members so as to generate a requested braking torque signal 6 for each wheel.

The requested braking torque signal 6 is processed by a management unit 7 that shares torque between the friction brake 2 and the auxiliary brake 3 in application of an optimizing criterion. For this purpose, the management unit 7 is connected to an estimator member 8 for estimating the energy that has been absorbed by the friction brake, this estimator member receiving temperature and speed information from the friction brake. The management unit 7 is also connected to an estimator member 9 for estimating the temperature of the coils of the auxiliary brake 3 and for estimating the torque available from the auxiliary brake 3, this estimator member 9 receiving current and speed signals from the electromagnetic brake 3. The management unit 7 is also connected to an electricity storage member 10 that transmits an electricity storage status to the management unit 7.

On the basis of this information, the management unit 7 generates a signal C2 representing the torque requested from the friction brake 2, which signal is transmitted to a control member 11 of the friction brake, and also a signal C3 representing the torque requested of the auxiliary brake 3, which signal is transmitted to a control member 12 of the auxiliary brake.

The requested torque signals C2 and C3 are generated by the management unit 7 on the basis of the information it receives, by detecting braking conditions for which the friction brakes 2 are not essential for delivering the requested level of braking, and by giving priority to actuating the auxiliary brake 3 so long as the braking parameters remain within said braking conditions. In particular, the management unit 7 takes account of the type of braking requested by the pilot, the torque available by electromagnetic braking, the temperature of the coils, the wear of the friction disks (itself a function of temperature, the number of brake actuations, the amount of energy absorbed, . . . ), and the state of the electricity storage device and of the dissipater resistors 21 associated with the electromagnetic brake 3.

The control member 11 of the friction brake 2 generates a power signal that is transmitted to the actuators of the friction brake 2. The control member 12 generates a power signal that is transmitted to the electromagnetic brake 3 and to a member 20 for sharing the energy produced by the auxiliary brake 3 so as to share it between powering the electrical actuators of the friction brake 2, storing electricity in the storage member 10, and dissipating energy in the energy dissipater resistors 21.

Figure 2:
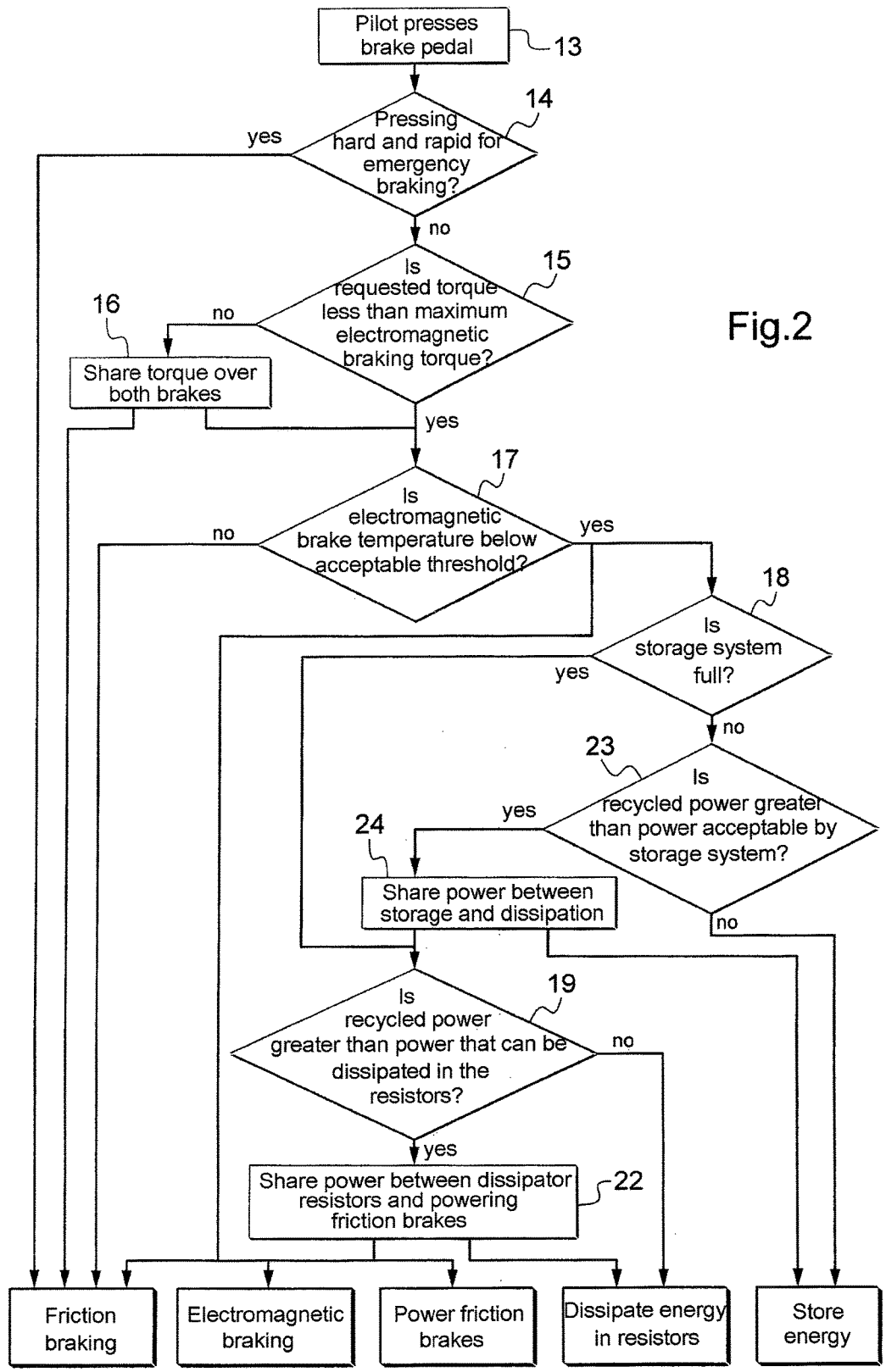
FIG. 2 shows an algorithm of a particular implementation of the method of the invention.

FIG. 2 shows a particular and non-limiting algorithm suitable for configuring the management unit 7. The starting point of this algorithm is the thrust 13 exerted by the pilot on the brake pedals. A test 14 verifies whether the thrust is hard and rapid for emergency braking. If the result is positive, then the friction brake 2 is actuated exclusively. If the request is negative, a test 15 verifies whether the torque requested is below a maximum braking torque that can be developed by the auxiliary brake 3. If the result of the test 15 is negative, the requested torque needs to be shared (16) between both brakes 2 and 3. Thus, the torque that is developed by the auxiliary brake 3 corresponds either to all of the requested torque, or else, in the event of the requested torque exceeding the maximum braking torque that can be developed by the auxiliary brake 3, to the fraction of the requested torque that can be developed by the auxiliary brake 3.

Nevertheless, the auxiliary brake 3 is activated only if its temperature is below an acceptable temperature threshold, in order to protect the auxiliary brake 3. This is the subject of a test 17. When the result of the test 17 is positive, then the auxiliary brake 3 receives a signal for controlling the auxiliary brake 3 to deliver the corresponding level of braking. If the result of the test 17 is negative, then the control signal for the auxiliary brake 3 is transformed into a control signal for the friction brake 2, which brake then provides all of the braking.

Thus, the various tests described above serve to detect a braking situation in which the action of the friction brake 2 is not essential, since the auxiliary brake is capable on its own of providing the braking. Here, this braking situation corresponds to the following conditions:
- no hard and rapid thrust on the pedals;
- requested torque less than the maximum braking torque that can be developed by the auxiliary brake 3; and
- temperature of the auxiliary brake below an acceptable temperature threshold.

It is only when the above situation does not apply that the friction brake is required to provide braking, either in addition to the auxiliary brake 3 (torque requested greater than the maximum braking torque that can be developed by the auxiliary brake 3, but the temperature of the auxiliary brake is below the temperature threshold), or else to provide all of the braking (temperature of the auxiliary brake greater than the acceptable temperature threshold or hard and rapid thrust on the pedals).

It should be observed that when the result of the test 17 is positive, and thus that the auxiliary brake 3 is being used, a test 18 is performed simultaneously to verify whether the system 10 for storing the electrical energy generated by the auxiliary brake 3 is full. When the result of test 18 is positive, a test 19 is performed to verify whether the recycled power can be dissipated in the resistors. When the result is positive, energy is shared (22) between powering the friction brakes and dissipating energy in the resistors 21. When the result is negative, the power is dissipated solely in the resistors 21.

When the result of the test 18 is negative, a test 23 is performed to verify whether the recycled power is greater than the power acceptable by the storage system. If the result is positive, then the power is shared (24) between storing energy and dissipating energy in the resistors 21, the fraction of the power that is dissipated in the resistors being subjected to the test 19, with the consequences as described above.

Naturally, the invention is not limited to the implementations described and various implementations may be applied thereto without going beyond the ambit of the invention as defined by the claims. In particular, although the method of the invention is applied here to managing the braking of a wheel fitted simultaneously with a friction brake and with an electromagnetic brake, the same method may be applied more generally to braking a group of wheels, in which it is not necessary for all of the wheels to be provided with their own auxiliary brakes.

The electromagnetic brake shown could be replaced by some other brake that enables energy to be dissipated by means other than friction, for example a hydraulic brake that, on being actuated, feeds hydraulic reservoirs under pressure.

Furthermore, the braking conditions may be determined with reference to braking parameters other than the requested braking torque, e.g. braking conditions may be determined directly from the deceleration setpoint 7.

What is claimed is:

1. A method of managing braking of an aircraft having landing gear with wheels fitted with friction brakes and with auxiliary brakes that enable energy to be dissipated by means other than friction, the method comprising the steps of:
   when a braking is requested and before braking is applied, testing braking parameters to determine whether the aircraft is in a braking situation for which the friction brakes are not essential for providing the requested braking; and
   performing the requested braking by giving priority to actuating the auxiliary brakes so long as the aircraft remains within said braking situation, and actuating the friction brakes only if the aircraft departs from said braking situation,
   the method further including the steps, when the auxiliary brake is used, of:
     analyzing the filling state of means for storing energy generated by the auxiliary brake, and of giving priority to storing the energy so long as the means for storing energy are not full;
     if the means for storing energy are full and if a recycled power is greater than power that can be dissipated in dissipater resistors, sharing recycled power between powering the friction brakes and dissipating energy in the dissipater resistors; and
     if the means for storing energy are full and if a recycled power is not greater than power that can be dissipated in dissipater resistors, dissipating recycled power in the dissipater resistors.

2. The method according to claim 1, wherein the braking parameters are selected from the group consisting of: requested braking torque; auxiliary brake temperature; and a signal indicating that hard and rapid thrust is being applied to brake pedals.

3. The method according to claim 2, wherein the braking situation corresponds to conditions in which the requested braking torque is less than a maximum torque that can be developed by the auxiliary brake, the auxiliary brake temperature is less than an acceptable temperature threshold, and no hard and rapid thrust is detected as being applied to the brake pedals.

4. The braking system according to claim 1, wherein the auxiliary brakes are not regenerative brakes.

5. A braking system for an aircraft including landing gear having wheels fitted with friction brakes and auxiliary brakes capable of dissipating energy by means other than friction, comprising:
- means for determining when a braking is requested but before braking whether the aircraft is entering a braking situation for which the friction brakes are not essential for providing requested braking,
- means for actuating the brakes by giving priority to actuating the auxiliary brakes so long as the aircraft remains in said braking situation, and for actuating the friction brakes only if the aircraft departs from said braking situation, and
- means for storing energy,
- wherein, the means for actuating the brakes is operative, when the auxiliary brake is used, for:
  - analyzing the filling state of means for storing energy generated by the auxiliary brake, and of giving priority to storing the energy so long as the means for storing energy are not full;
  - if the means for storing energy are full and if a recycled power is greater than power that can be dissipated in dissipater resistors, sharing recycled power between powering the friction brakes and dissipating energy in the dissipater resistors; and
  - if the means for storing energy are full and if a recycled power is not greater than power that can be dissipated in dissipater resistors, dissipating recycled power in the dissipater resistors.

6. The braking system according to claim 5, wherein at least one wheel is fitted with both a friction brake and an auxiliary brake.

7. The braking system according to claim 5, wherein the friction brakes are fitted with electrical actuators, and wherein the auxiliary brakes are electromagnetic brakes.

8. The braking system according to claim 7, wherein the means for storing energy comprises an electricity storage member configured to store energy generated by the electromagnetic brakes and electrical energy sharing member configured to share electrical energy generated by the electromagnetic brakes among the electricity storage member, a power supply for electrical actuators of the friction brakes, and dissipater resistors.

9. The braking system according to claim 5, wherein the auxiliary brakes are not regenerative brakes.

10. A method of managing braking of an aircraft having landing gear with wheels fitted with friction brakes and with unpowered auxiliary brakes that enable energy to be dissipated by means other than friction, the method comprising the steps of:
- when a braking is requested, testing braking parameters, before braking, to determine whether the aircraft is in a braking situation for which the friction brakes are not essential for providing the requested braking; and
- performing the requested braking by giving priority to actuating the auxiliary brakes so long as the aircraft remains within said braking situation;
- wherein the braking parameters are selected from the group consisting of: requested braking torque; auxiliary brake temperature; and a signal indicating that hard and rapid thrust is being applied to brake pedals;
- wherein the braking situation corresponds to conditions in which the requested braking torque is less than a maximum torque that can be developed by the auxiliary brake, the auxiliary brake temperature is less than an acceptable temperature threshold, and no hard and rapid thrust is detected as being applied to the brake pedals; and
- wherein the auxiliary brakes are preferred over the friction brakes for a low torque braking situation and the friction brakes are actuated only if the aircraft departs from the braking situation for which the friction brakes are not essential for providing the requested braking;
- the method further including the steps, when the auxiliary brake is used, of:
  - analyzing the filling state of means for storing energy generated by the auxiliary brake, and of giving priority to storing the energy so long as the means for storing energy are not full;
  - if the means for storing energy are full and if a recycled power is greater than power that can be dissipated in dissipater resistors, sharing recycled power between powering the friction brakes and dissipating energy in the dissipater resistors; and
  - if the means for storing energy are full and if a recycled power is not greater than power that can be dissipated in dissipater resistors, dissipating recycled power in the dissipater resistors.

* * * * *